May 22, 1928.
M. R. SHIPLEY ET AL
1,670,639
METHOD OF MAKING STOVE PIPE CASING
Filed April 5, 1927  4 Sheets-Sheet 1
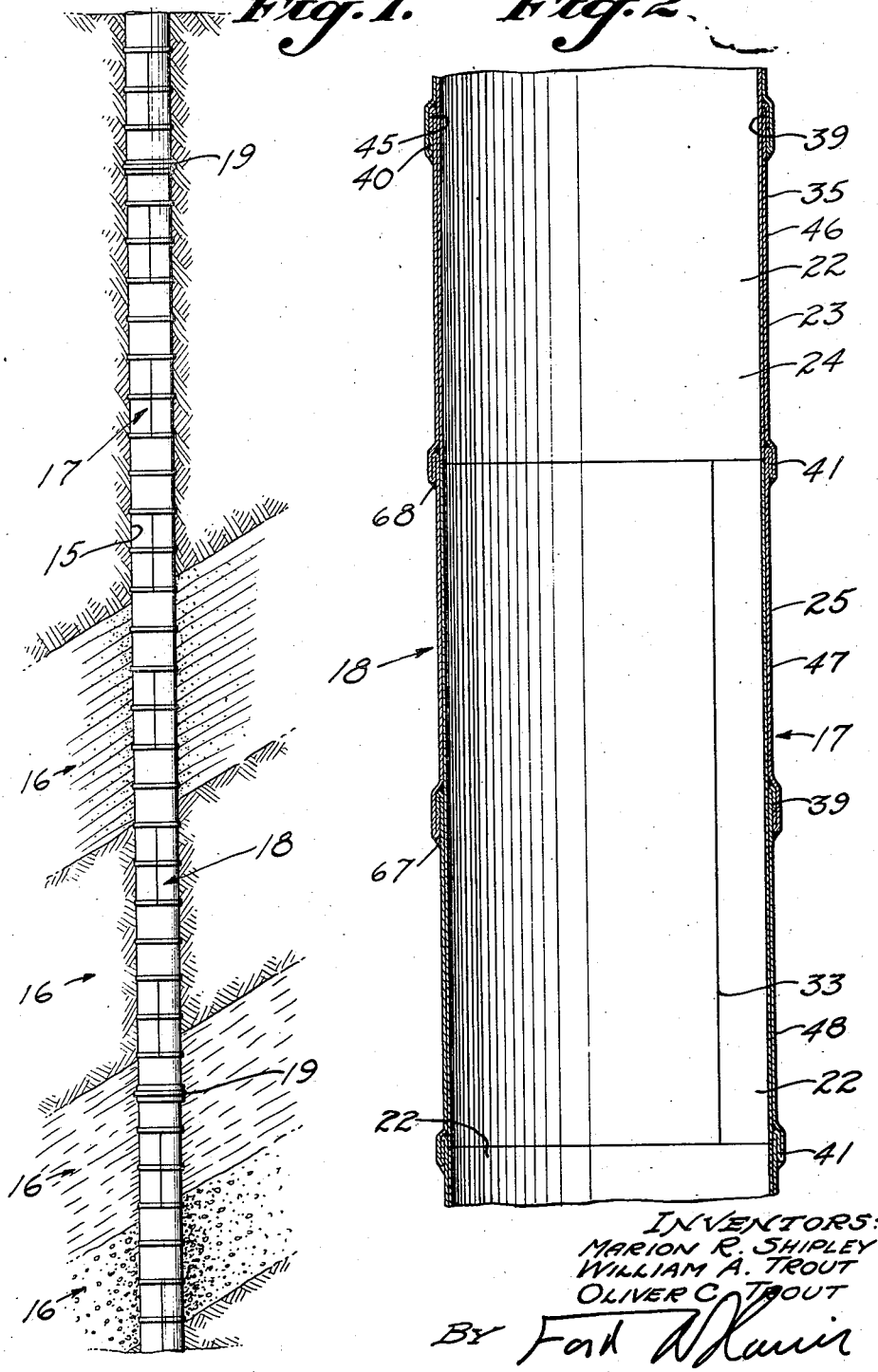

May 22, 1928.
M. R. SHIPLEY ET AL
1,670,639
METHOD OF MAKING STOVE PIPE CASING
Filed April 5, 1927     4 Sheets-Sheet 2
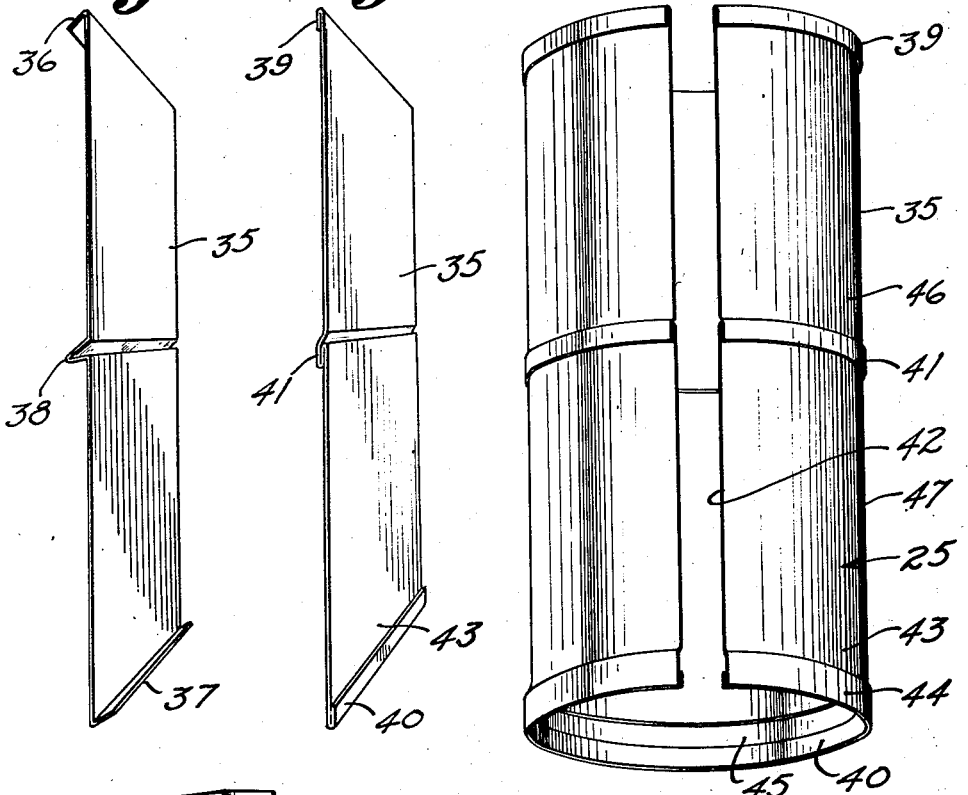
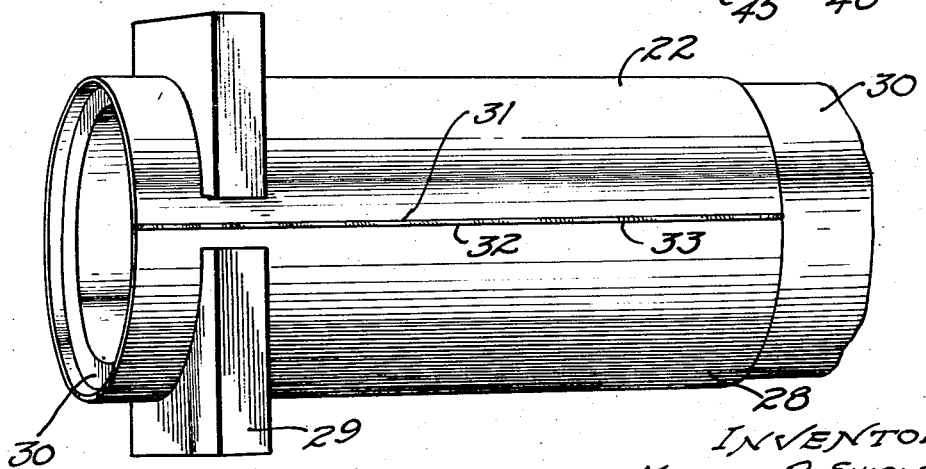
INVENTORS:
MARION R. SHIPLEY
WILLIAM A. TROUT
OLIVER C. TROUT.
BY
ATTORNEY.

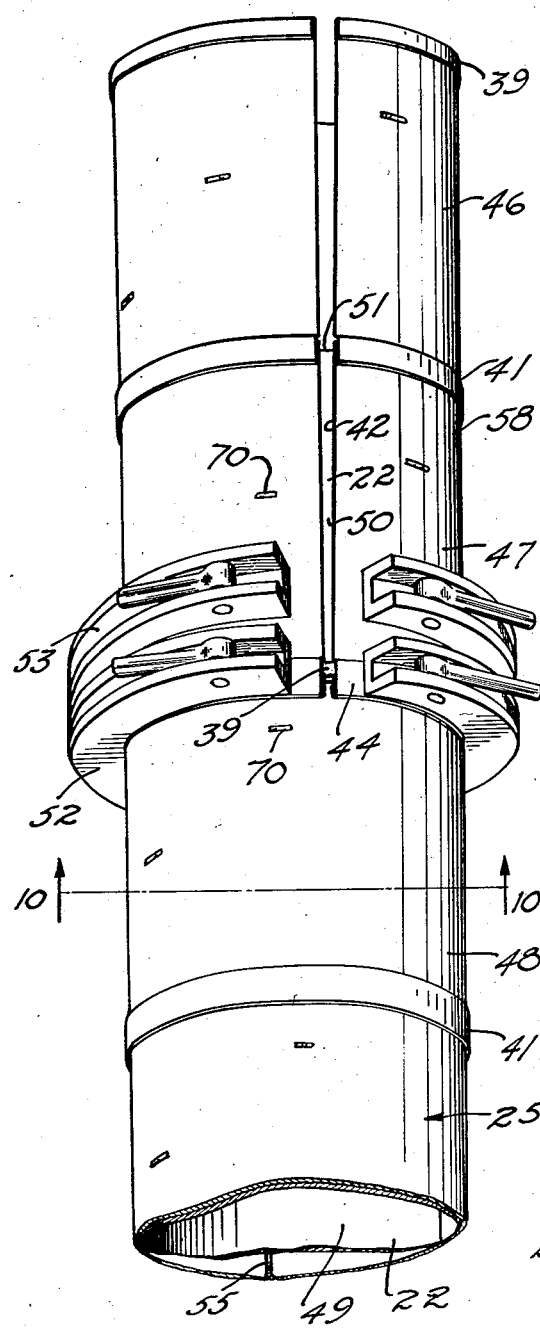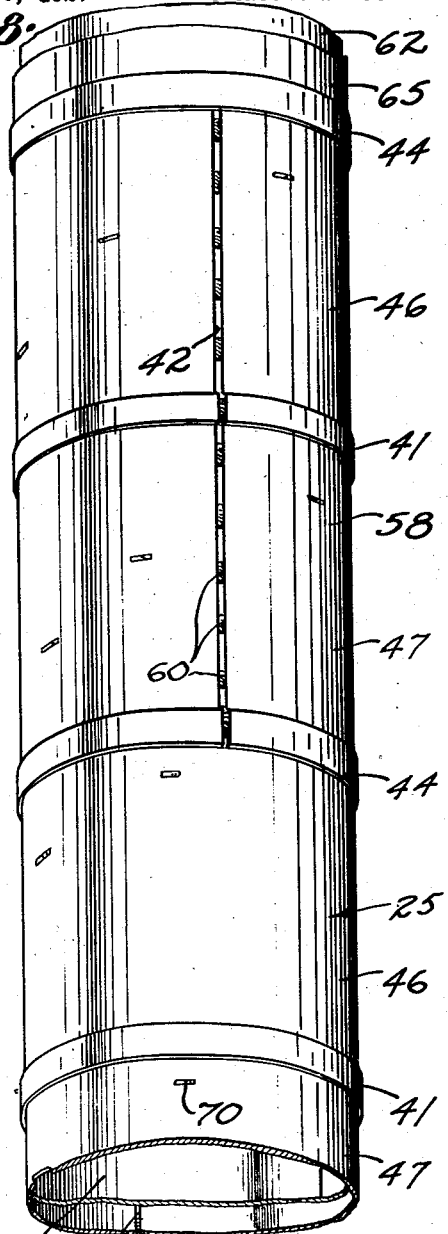

May 22, 1928. 1,670,639
M. R. SHIPLEY ET AL
METHOD OF MAKING STOVE PIPE CASING
Filed April 5, 1927 4 Sheets-Sheet 4
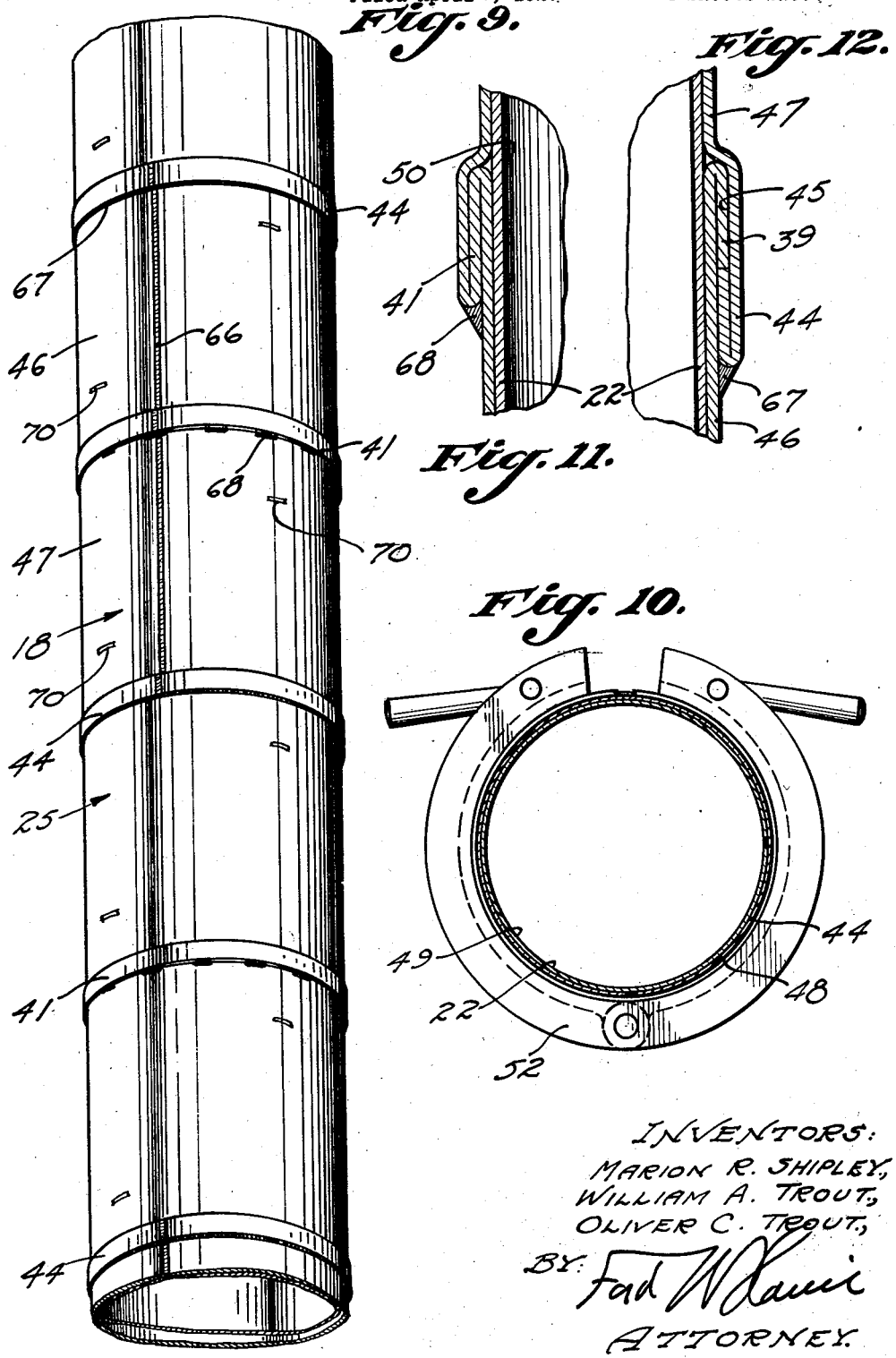

Patented May 22, 1928.

1,670,639

UNITED STATES PATENT OFFICE.

MARION R. SHIPLEY, OF MANHATTAN BEACH, AND WILLIAM A. TROUT AND OLIVER C. TROUT, OF LOS ANGELES, CALIFORNIA; SAID WILLIAM A. TROUT AND SAID OLIVER C. TROUT ASSIGNORS, BY MESNE ASSIGNMENTS, TO LOS ANGELES MANUFACTURING COMPANY, INC., OF LOS ANGELES, CALIFORNIA, A CORPORATION OF CALIFORNIA.

METHOD OF MAKING STOVEPIPE CASING.

Application filed April 5, 1927. Serial No. 181,101.

This invention relates to the art of manufacturing oil well drilling equipment and it relates particularly to an improvement in the art of making stovepipe casing from sheet metal.

As an oil well is drilled, a well casing is at certain intervals advanced into the hole for reinforcing the wall against cave-ins, excluding ground water, and to form a smooth walled lining for the well through which drilling tools may be easily extended and operated to finish drilling the well.

Two types of casing are used for this purpose, screw casing and stovepipe casing. Screw casing is made up from sheet wrought iron which is rolled into cylindrical form and welded. Each end of the casing is provided with screw threads which are adapted to be screwed into couplings for joining adjacent sections together.

Stovepipe casing as made at present, comprises inner and outer layers of comparatively soft sheet metal which are rolled into cylindrical form and secured together either by riveting or by rolling inter-engaging corrugations in the two layers after they are placed together. The sections of the outer and inner layers are staggered relative to each other and the entire linear tensile strength of the casing resides in the connection of each adjacent pair of sections, in each layer, by a section of the other layer which overlaps and is joined to said pair of sections by riveting, rolling, or some other method. Thus, each section of the inner layer overlaps and constitutes the only connection between an adjacent pair of sections of the outer layer.

Due to the above noted method by which the stovepipe casing in general use is formed, it is necessary that both inner and outer layers be made of soft metal which wears away quickly when the drill pipe rubs against the inner layer. Any slight deviation of the hole from straight will cause such a rubbing, and it is common to have the inner layer of casing worn in two, thus causing the entire casing to part at this point.

In addition to this defect, the linear tensile strength of stovepipe casing as built at present is inadequate to stand the strain of supporting five hundred to several thousand feet of casing which is necessary in the installation of casing in a well. Far from being uncommon, it is almost the usual thing that when installing a "long" length of stovepipe casing, it will pull in two when partially lowered into place. A fairly high linear tensile strength is obtained in the corrugated stovepipe casing, but the inwardly extending corrugations wear through much quicker, when the drill pipe starts to rub, than the cylindrical wall of ordinary riveted stovepipe casing. And when the inner lamination thus wears in two, the casing parts at this point.

It is an object of our invention to provide a stovepipe casing which has a linear tensile strength equivalent to that of any of the present casings, but which will not part should the inner layer thereof be worn in two.

Moreover, each outward corrugation in corrugated casing forms a pocket which fills up with cement as a cementing plug passes by in a cementing operation, the amount of cement thus wasted in a thousand feet of casing being excessive. Riveted casing on the other hand is seldom truly cylindrical so that it is very difficult to form a fluid-tight fit between a cementing plug and the casing throughout the length of the casing.

It is therefore an object of our invention to provide a stovepipe casing which has a smooth and truly cylindrical inner surface which will make a uniformly fluid-tight fit with a cementing plug as it passes downward through the casing.

It is also an object of our invention to provide a process of making a stovepipe casing whereby the inner layer may be made of metal which is too hard to successfully punch or corrugate.

The best of stovepipe casing as now made leaks badly, even when new, and it is therefore a further object of our invention to provide a stovepipe casing and a process of making same in which the casing is thoroughly water-tight under all normal operating conditions.

It is another object of our invention to provide a process of manufacturing stovepipe casing which is economical to perform.

The present case relates to improvements in the casing and process of making same, set forth in the application of Marion R. Shipley for United States Letters Patent, Serial No. 745,117, filed October 22, 1924.

Other objects and advantages will be made manifest in the following description and in the accompanying drawings, in which:

Fig. 1 is a diagrammatic view showing a well bore in which is inserted a preferred form of the stovepipe casing of our invention.

Fig. 2 is an enlarged vertical medial sectional view of a portion of the casing shown in Fig. 1.

Figs. 3, 4, 5 and 6 are views illustrating the steps of the process by which the inner and outer lamination sections, which are utilized in the manufacture of our improved casing, are formed.

Figs. 7 to 10 inclusive illustrate the steps in our novel process by which inner and outer lamination sections are assembled in the formation of stovepipe casing.

Figs. 11 and 12 are detailed sectional views illustrating respectively a reinforcing fold and an outer section interlocking joint of our novel stovepipe casing.

Referring specifically to the drawings, Fig. 1 shows a portion of a well 15 which has been bored through a series of inclined strata 16, a geological formation which is frequently found above oil pockets. The well 15 is lined with a stovepipe casing 17 which has been cemented into place at its lower end so that the walls of the well hole have settled into contact with the outer surface of the casing. The casing 17 is made up of sections or lengths 18, one of which is shown completely in Fig. 1, these lengths being about forty feet long and provided at their ends with couplings 19 whereby meeting ends of adjacent lengths are connected together. The couplings 19 may be of any desired character, the coupling at present used for this purpose being shown and described in the application for United States Letters Patent Serial No. 36,841 filed June 13, 1925, by Oliver C. Trout for a stovepipe casing coupling.

Each of the lengths 18 is made up of a tubular inner lamination 22 and outer tubular lamination 23. The inner tubular lamination 22 is formed of a plurality of sections 24, of the same diameter, which are disposed end to end, with the ends thereof abutting. The tubular outer lamination 23 is formed of a plurality of sections 25 which are placed end to end about the tubular inner lamination 22 so that the adjacent ends of the sections 25 interlock. The outer tubular lamination 23 tightly grips the inner lamination 22 so that the outer sections are disposed in break-joint relation with the inner sections.

The details of the structure of the novel stovepipe casing 17 as well as the process by which this casing is formed may be described as follows:

The sections 24 of the inner lamination 22 are first formed, as shown in Fig. 3, by bending a sheet 28 of high carbon steel by the use of forming clamps 29 about a mandrel 30. Opposite edges 31 and 32 of the sheet 28 are thus brought adjacent to each other and are connected by the application of welding material to form a welded seam 33. After the seam 33 has been formed, the clamps 29 are released and the section 22 is slid from the mandrel 30. The inner lining sections 22 thus formed on the mandrel all have exactly the same inner diameter. The gauge of the high carbon steel sheet 28 is sufficiently accurate so that the outside diameter of the inner lamination sections 22 is also practically uniform.

The sections 25 and the tubular outer lamination 23 are formed, as shown in Figs. 4, 5 and 6. A rectangular sheet of ductile steel 35 is first formed in a break so that opposite edge portions 36 and 37 are bent from the body of the sheet 35, as shown in Fig. 4, and the central portion 38 of the sheet 35 is outstruck from the body thereof as shown. The sheet of metal 35 is now placed in a press and the edges 36 and 37 and the outstruck projection 38 are pressed flat against the body of the sheet 35, as shown in Fig. 5. The bent portions 36 and 37 thus form ribs 39 and 40 on the opposite sides of opposite edges of the sheet 35 and the outstruck projection 38 forms a fold 41 extending substantially parallel to the ribs 39 and 40 and disposed substantially in the middle of the sheet 35 equidistant from the ribs 39 and 40.

The sheet 35 is now passed between a suitable set of roller dies which are disposed perpendicular to the ribs 39 and 40 and the fold 41 and which roll the sheet of metal 35 into a tubular outer lamination section 25, as shown in Fig. 6, having a slit 42 formed lengthwise in the wall thereof. The sheet 35 is rolled so that the rib 39 and the fold 41 are upon the outside of the section 25, and so that the rib 40 is disposed on the inside of the section 25. In rolling the sheet 35, the end 43 thereof which carries the rib 40 is stretched to form a bell 44 on the inside of the mouth of which the rib 40 is disposed. The bell 24 is of such length that an annular space 45 is provided above and adjacent to the rib 40 which is of the same axial depth as the rib 39. In addition to stretching the end portion 43 of the sheet 35, it is also necessary in rolling the section 25, to stretch the rib 39 and the fold 41 so that these will not tend to draw the upper and lower halves 46 and 47 of the section 25 out of true cylindrical shape.

The remaining steps of our novel process of making stovepipe casing are taken up with the assembly of the outer and inner lamination sections formed as above described. In this assembly a first outer lamination section 25, as indicated by the numeral 48 in Fig. 7, is placed about two inner sections 22 which are indicated by the numerals 49 and 50 and which are placed end to end so that their abutting ends come together within the fold 41 of the outer section 48, and so that the inner section 50 extends from beyond the rib 39 of the section 48 substantially half of its length to a point indicated by the numeral 51. The actual applying of the outer section 48 to the inner sections 49 and 50, as just described, takes place prior to the step illustrated in Fig. 7, and the section 48 in this prior step is tightly gripped by gauge clamps 52 and 53 so that the section 48 is forced into tight contact with the inner sections 49 and 50. The adjacent edges of the slit 42 of the section 48 are then connected as by a welded seam 55 while the section 48 is thus clamped in position. In the clamping operation of said prior step, the clamp 52 is applied to the fold 41 of the section 48 and the clamp 53 is applied to the body portions 46 and 47. While but one each of the clamps 52 and 53 is shown in the drawings, any number of these clamps may be employed sufficient to properly position the section 48 in tight gripping relation with the inner sections 49 and 50, while the welding of the seam 55 takes place. When the seam 55 has been completed or a sufficient number of spot welds formed through its length to hold the section 48 in the position in which it is clamped, the clamps are removed and the outer section 48 with the inner sections 49 and 50 gripped therein, are rotated so that the seam 55 is disposed downward as shown in Fig. 7.

A second outer section 25 indicated by the numeral 58 is now slipped over the exposed half of the inner section 50, and the bell 44 of the outer section 58 is disposed about the rib 39 of the outer section 48 so that the rib 39 will fit into the annular space 45 of the bell of the section 58. The clamp 52 is now placed about the bell 44 of the section 58 and the bell 44 is forced inward into tight gripping relation with the rib 39 of the section 48, as clearly shown in the detailed sectional view of Fig. 12. The clamp 53 is now placed about the lower half 47 of the outer section 58 so as to tightly contract this into contact with the inner section 50. Stops of welding material 60, as illustrated in Fig. 8, are now applied to connect the adjacent edges of the slit 42 of the section 58 where these edges are held closely together by the clamps 52 and 53, and thereafter the clamps are released. A third inner section 22 indicated by the numeral 62 in Fig. 8 is now slid into the upper half 46 of the outer section 58 so as to abut against the upper end of the inner section 50 at 51. The clamp 52 is now placed about the fold 41 of the outer section 58, the clamp 53 is moved upward toward said fold 41, and the two clamps are tightened into place to cause the portions of the outer section 58 which they contact to tightly grip the inner sections 50 and 62. Further spots of welding material 60 are applied while the clamps are in this position so as to unite other portions of the edges of the slit 42 of the section 58. By applying the clamps 52 and 53 to the upper half 46 of the section 58 and spot welding together the edges of the upper portion of the slit 42, the outer lamination section 58 is brought into tight gripping relation with the inner lamination sections 50 and 62, and, due to the cylindrical gauging effect brought about by the application of the gauging clamps 52 and 53, the outer section 58 and the inner sections 50 and 62 are united in a true cylindrical shape which they retain due to the welding together of the edges of the slit 42. When the section 58 has thus been entirely secured in place by the spot welding 60, the sections already assembled are rotated so as to dispose the seam in the section 58 downward and the third outer section 25, as indicated by the numeral 65 in Fig. 8, is then applied to the outer section 58, the inner section 62 (and another inner section) in the same manner that the outer section 58 was applied to the outer section 48 and the inner sections 50 and 62.

As above indicated, the seams of adjacent outer sections 25 are disposed 180° apart. The seams of adjacent inner sections are likewise diametrically opposed and the diametral plane of the inner section seams is disposed at an angle of ninety degrees to that of the outer section seams so that the seams of adjacent outer and inner sections are all disposed either ninety or one hundred and eighty degrees apart, in the cylindrical composite wall of the stovepipe casing 17.

When a sufficient number of inner and outer sections have thus been connected together to form a length 18, flange members of the couplings 19 are applied to the end of the length in the manner described in the above noted application. The spot welds 60 are also joined by further application of welding material to form seams 66, as clearly shown in Fig. 9.

The essential steps of forming the casing of our invention are now completed. It is, however, advantageous to apply a packing 67 of welding material between the lower edge of each of the bells 44 and the adjacent outer surface of the next outer section 25. This packing weld 67 is not required to strengthen the joint formed between adjacent outer sections, but is primarily for the purpose of making the casing water-tight. Also, as a protection against the folds 41 catching on sharp rocks or other objects and being flared outward, a series of spot welds 68, preferably four in number, are applied between the outer lip of each fold 41 and the outer surface of the section 25 upon which that fold is formed.

By the novel process above described, a stovepipe casing may be formed with an inner lining of such hard steel that it is not practicable to punch it for rivets, or to corrugate it for the purpose of uniting adjacent sections of the outer lamination. This advantage is achieved by the forming of adjacent ends of the outer section so that they may interlock to form a substantial continuous tubular member and which, while it grips and therefore adequately supports the inner lamination, depends for lineal tensile strength upon the interlocking of the adjacent ends of the outer sections rather than upon the connection of the adjacent sections of the outer lamination by overlapping sections of the inner lamination. In order to accomplish this structure, the novel process above set forth had to be evolved by which each outer lamination section enters into an exceedingly tight gripping relation with two adjacent inner sections and in an entirely separate gripping and interlocking relation with an adjacent outer section.

By virtue of the separate utility of the above steps it is possible to form a stovepipe casing of sheet metal which has exceedingly high internal wear resisting qualities and which will not separate even upon the highly improbable event that the inner wear-resisting lamination should actually wear in two. While the stovepipe casing described herein is being fairly extensively used, there has been no instance where the inner lamination has been worn in two.

As a safeguard against the dropping of sections of the inner lamination into the well, due to their being worn by contact with the drilling tools, a series of slots 70 are provided in spiral relation in the body of each of the outer sections 25 so as to permit spot welding through the slots which will connect each of the inner lamination sections 22 to each of the outer sections 25 by which it is gripped. It is to be understood, however, that the spot welding through the slots 70 is not an essential part of the process or invention and while it is valuable for the above noted purpose, it does not add substantially to the linear tensile strength of the casing. At present ten of the slots 70 are formed in each of the outer sections 25.

The diameters in which the casing 17 is made at present vary between 12" and 24". In making casing within these limits, the inner tubular lamination sections 22 are preferably formed of six gauge sheet high carbon steel wall. The outer lamination sections 25 are preferably formed of eight gauge ductile stamping steel. When the outer lamination sections are formed of eight gauge metal, or heavier, the strength of the joints between adjacent outer sections has been proved in actual test to exceed the strength of the body of one of these sections intermediate its ends. In a testing machine a tensile force of two hundred thousand pounds was imposed upon a length of the casing 17 and the casing parted between the joints, the latter being undistorted by this enormous force.

In addition to the stovepipe casing of our invention having a greater linear tensile strength than that of any casing previously made, it is provided with annular reinforcement at frequent intervals without sacrificing the smooth inner surface of the casing. This annular reinforcement prevents collapsing of the casing though it may be subjected to excessive strains as by a shifting of one of the strata 16 through which the well 15 extends. Such a shifting frequently occurs when subterranean pressure has been relieved by a discharge of gas or oil through the well and therefore the reinforcing feature of our stovepipe casing adds greatly to its value. No other stovepipe casing previously made has a structure which provides both a smooth inner surface and annular reinforcing ribs formed integral with the wall of the casing.

In all other forms of casing the smooth and truly cylindrical inner surface of our casing is lacking either because of the presence of rivets, corrugations, screw couplings or other features essential to the structure of the casing. In our casing all of these features are eliminated and at the same time a casing is produced which is water-tight and which is stronger, cheaper, and longer lived than any casing previously known.

What we claim is:

1. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; and welding together the edges of the split in said second outer section.

2. A process as in claim 1 in which said tubular inner lamination sections are formed accurately to have the desired inside diameter for said casing.

3. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; welding together the edges of the split in said second outer section; and packing the joint between said first and second outer sections so this is water tight.

4. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; welding together the edges of the split in said second outer section; and welding the joint between said first and second outer sections so this is water tight.

5. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; forming a fold in the metal of each of said outer sections intermediate its ends, said fold constituting a reinforcing bead; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; and welding together the edges of the split in said second outer section.

6. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; forming a fold in the metal of each of said outer sections intermediate its ends, said fold constituting a reinforcing bead; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; welding together the edges of the split in said second outer section; and securing a lip of said fold of each of said outer sections to the outer surface of said section.

7. A process of making stovepipe casing, said process comprising: forming a plurality of tubular inner lamination sections; forming a plurality of tubular outer lamination sections so that they are split to permit expansion from normal diameter; forming the ends of said outer sections so that they are adapted to interlock when said outer sections are disposed end to end; forming a fold in the metal of each of said outer sections intermediate its ends, said fold constituting a reinforcing bead; clamping one of said outer sections in tightly embracing relation with two of said inner sections; welding together the edges of the split in said outer section; placing a third inner section end to end with one of said two inner sections which projects from said outer section; clamping a second outer section about said projecting inner section and said third inner section in tightly embracing relation therewith and so that adjacent ends of said first and second outer sections interlock; welding together the edges of the split in said second outer section; and welding a lip of said fold of each of said outer sections to the outer surface of said section.

In testimony whereof, we have hereunto set our hands at Los Angeles, California, this 30th day of March, 1927.

MARION R. SHIPLEY.
WILLIAM A. TROUT.
OLIVER C. TROUT.